(12) United States Patent
Bossard

(10) Patent No.: US 8,491,678 B1
(45) Date of Patent: Jul. 23, 2013

(54) ACTIVE GAS FLOW HEAT EXCHANGER AND ITS ASSOCIATED METHOD OF OPERATION

(76) Inventor: Peter R. Bossard, Ivyland, PA (US)

( * ) Notice: Subject to any disclaimer, the term of this patent is extended or adjusted under 35 U.S.C. 154(b) by 0 days.

(21) Appl. No.: 13/282,443

(22) Filed: Oct. 26, 2011

Related U.S. Application Data

(62) Division of application No. 12/122,673, filed on May 17, 2008, now abandoned.

(60) Provisional application No. 61/016,506, filed on Dec. 24, 2007.

(51) Int. Cl.
*B01J 7/00* (2006.01)
*A23C 3/02* (2006.01)
*F28D 15/00* (2006.01)
*H01L 23/467* (2006.01)

(52) U.S. Cl.
USPC .............. 48/61; 165/65; 165/66; 165/104.34; 165/121

(58) Field of Classification Search
USPC ................ 48/61; 165/65, 66, 104.34, 121
See application file for complete search history.

(56) References Cited

U.S. PATENT DOCUMENTS

| | | | | |
|---|---|---|---|---|
| 3,141,762 A | * | 7/1964 | Serck-Hanssen | 423/151 |
| 4,044,820 A | * | 8/1977 | Nobles | 165/66 |
| 7,069,977 B2 | | 7/2006 | Shinohara et al. | |
| 2003/0039608 A1 | * | 2/2003 | Shah et al. | 423/650 |

\* cited by examiner

*Primary Examiner* — Matthew Merkling
(74) *Attorney, Agent, or Firm* — LaMorte & Associates P.C.

(57) ABSTRACT

A system and method of recovering some of the latent heat of vaporization in a system having a heated environment that adds heat to liquid material and converts the liquid material into gaseous material. The latent heat of vaporization is partially recovered using a unique heat exchanger. The heat exchanger preheats the liquid material entering the heated environment with heat energy from the gaseous material exiting the heated environment. The heat exchanger has a gas flow path. A volume of a gas medium fills the gas flow path. A pump causes the gas medium to flow through the gas flow path at a predetermined mass flow rate. The gas medium and its flow rate are selected to ensure that the specific heat of the gas medium surpasses that of the gaseous material exiting the heated environment.

13 Claims, 4 Drawing Sheets

ACTIVE GAS FLOW HEAT EXCHANGER AND ITS ASSOCIATED METHOD OF OPERATION

RELATED APPLICATIONS

This application is a divisional of U.S. patent application Ser. No. 12/122,673 filed May 17, 2008, now abandoned which claims the priority of provisional patent application No. 61/016,506, filed Dec. 24, 2007.

BACKGROUND OF THE INVENTION

1. Field of the Invention

In general, the present invention relates to the structure of heat exchangers. More particularly, the present invention relates to heat exchangers that transfer heat from exhaust gases to the source material used to produce the exhaust gases, thereby preheating the source material.

2. Prior Art Statement

Heat exchangers are typically used to recover heat energy that would otherwise be wasted. Generally, the more energy that is recovered by a system, the more efficient that system can operate. It will therefore be understood that with rising fuel prices and greenhouse gas concerns, the recovery and reuse of exhaust heat energy is particularly important in systems that react hydrocarbon fuels. The more energy that can be recovered and reused, the less hydrocarbon fuel that needs to be consumed in order to generate a given amount of useful energy. Thus, by recovering heat from exhaust gases, the fuel efficiency of the system increases. It will therefore be understood that when designers attempt to make a system more efficient a heat exchanger is often used to recover and reuse heat energy. It will further be understood that the more efficient a heat exchanger system can be made, the more fuel efficient the overall system can be made.

In an attempt to make heat exchanger systems highly efficient, extremely complex multi-stage heat exchanger systems have been designed and integrated devices like automobile engines. Consider, by way of example, U.S. Pat. No. 7,069,977 to Shinohara, entitled Heat Exchanger. Although such heat exchangers do increase the efficiency of certain systems, the application of such heat exchangers is limited to scenarios where a significant temperature differential exists between the materials across which heat is being exchanged.

There are many systems, other than internal combustion engines, that react gases in order to obtain some useful byproduct. For instance, many polymers are created by reacting different vapors. In certain fuel cell systems, water vapor and fuel vapor are reacted to create the hydrogen gas used to power the fuel cell. In such systems, it is often the case that some of the materials to be reacted are liquids at ambient pressure and temperature. This is often the case if the material to be reacted is water, or a distilled petroleum product. Accordingly, the material to be reacted has to be actively heated and converted into a gas before it can be utilized in a reaction. Since the material to be reacted has to be actively heated, the resultant gases exhausted after the desired reaction typically contain a significant amount of heat energy. Much of this heat energy is commonly lost as the resultant gases are vented as exhaust while still containing the latent heat of vaporization.

In order to conserve energy, it makes sense to recapture some of the heat energy present in the exhaust gases and use that heat energy to help vaporize the liquid material that is to be reacted. As long as the temperature of the exhaust gases exceeds the temperature of the liquid material, it is relatively simple to transfer heat energy from exhaust gases to the liquid material. The problem becomes much more complex in systems where the outgoing exhaust gas and incoming liquid material approach a temperature equilibrium. In the case of a two channel steam heat exchanger when the exiting stream is of water vapor is at the boiling temperature and the incoming stream of is water at the boiling temperature, there is no longer any transfer of energy between the two streams even though most of the energy is contained in the exiting stream of vaporized water and relatively little energy in the incoming stream of liquid water. This is because both streams are the same temperature and a temperature difference is required to transfer energy from one stream to the other.

In order for a liquid to be heated into a vapor, it must change phase from a liquid to a gas. In order for the liquid material to change phase, heat energy must be added to the liquid material. Although significant heat energy may be added, the heat energy is utilized in the phase change and does not affect temperature. For example, it takes a significant amount of energy to convert water at 100 degrees Celsius to steam at 100 degrees Celsius at one atmosphere of pressure. It will therefore be understood that steam at 100 degrees Celsius contains the latent heat of vaporization and therefore contains far more energy than does water at 100 degrees Celsius.

Once a material has been vaporized, it is very difficult to recover the latent heat of vaporization using traditional heat exchanger designs. Traditional heat exchangers rely upon a temperature differential to be present between materials in order to transfer heat between those materials. Traditional heat exchangers absorb heat energy from the high temperature material, and using convection and/or conduction, transfer that heat energy to the low temperature material.

In a system where a liquid material is generally at the same temperature as the vaporized material, such as a counter flow heat exchanger were water is the material in both channels, there is no temperature differential when one channel is liquid water and the other channel steam at the same pressure. Although the vaporized material contains the latent heat of vaporization, this energy cannot be recovered because there is no impetus of a temperature differential to cause the heat energy to flow.

A need therefore exists for a heat exchanger system that can effectively transfer energy between a vapor and a liquid even though there is little or no temperature difference between the vapor and the liquid. This need is met by the present invention as described and claimed.

SUMMARY OF THE INVENTION

The present invention is a system and method of recovering some of the latent heat of vaporization in a system having a heated environment that adds heat to liquid material and converts the liquid material into gaseous material. The latent heat of vaporization is partially recovered using a unique heat exchanger. The heat exchanger preheats the liquid material entering the heated environment with heat energy recovered from the gaseous material that is being condensed to liquid before exiting the heat exchanger environment.

The heat exchanger is a dynamic heat exchanger because it has an independently circulating counter flow gas flow stream that is thermally exposed to the gaseous material exiting the heated environment. This condenses the gaseous material to a liquid before it exits the dynamic heat exchanger. The independent counter flowing gas stream would typically still be use to capture energy from the higher temperature gas streams. The counter flowing gas stream then has enough high quality heat and temperature to vaporize the liquid material entering the heated environment of the dynamic heat exchanger.

A volume of a gas medium fills the gas flow path. A pump causes the gas medium to flow through the gas flow path at a predetermined mass flow rate. The gas medium and its flow rate are selected to ensure that the heat capacity of the gas medium surpasses that of the gaseous material to be liquefied before exiting the heated environment. In this manner, the gas medium is capable of absorbing more heat than is present in the exiting gaseous material in its vapor stage and a temperature difference between the gaseous transfer medium and the gaseous material to be liquefied can be maintained. The gas medium, therefore, absorbs and transfers not only the heat energy from the temperature of the gaseous material but also some of the heat energy captured in the latent heat of vaporization. By transferring this heat energy to the liquid material, enough heat energy is available to fully vaporize the liquid material because the dynamic heat exchanger can maintain a temperature difference in the heat exchanger using a non-condensing gas such as hydrogen, helium or nitrogen as the heat transfer medium.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention heat exchanger arrangement can be used in any system where it is desirable to exchange heat between hot gases and colder fluids, the heat exchanger arrangement is best understood if described in a practical application. For this disclosure, the heat exchanger arrangement is first shown in a simple steam engine application. In a secondary embodiment, the present invention is applied to a more complex system of steam reforming fuel and hydrogen gas supply system. The two illustrated applications of the present invention heat exchanger arrangement are intended to be exemplary and are presented to show particular advantages of the heat exchanger arrangement. Since the described embodiments are merely exemplary, it will therefore be understood that the heat exchanger arrangement can be applied to systems other than those described and that the exemplary applications should not be considered a limitation.

Figure 1:
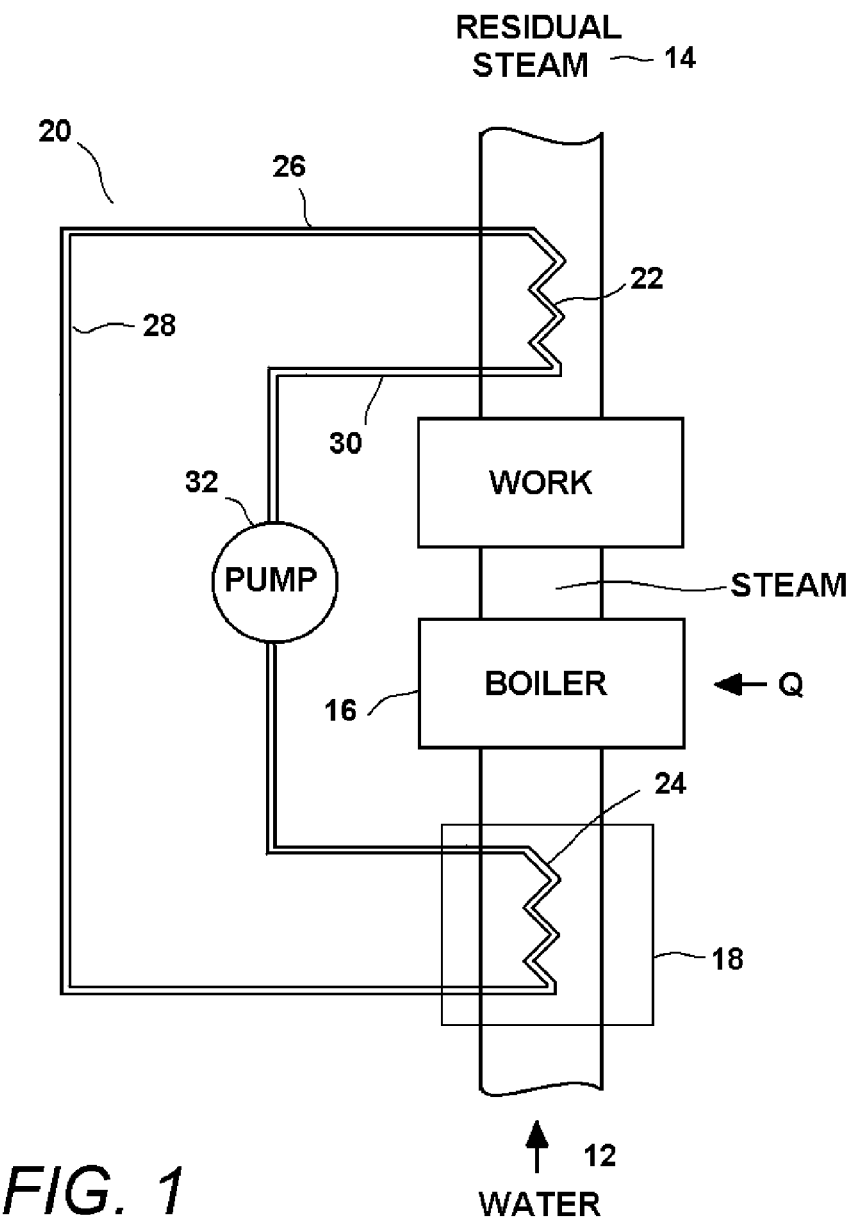
FIG. 1 is a block diagram schematic of a present invention heat exchanger shown applied to a simple steam powered system.

Referring to FIG. 1, a schematic of a simple steam engine 10 is shown containing the present invention heat exchanger arrangement 20. The exemplary steam engine 10 creates steam by heating water 12 to a temperature above its boiling point. Heat energy (Q) is added to the water to convert it to steam. The steam is used to do work. Once the work is complete, residual steam 14 is vented as exhaust.

As is indicated in FIG. 1, the water 12 awaiting to be used in the steam engine 10 is initially in its liquid state. The water 12 is introduced into a boiler 16 and is converted into steam. The steam is used to do work and residual steam 14 is vented. The heat exchanger arrangement 20 recycles heat energy from the residual steam 14 and uses that heat energy to preheat the incoming water 12. The more heat energy that can be recycled, the more efficiently the steam engine 10 will be able to run. It will therefore be understood that the more effective the heat exchanger arrangement 20 is, the less heat energy (Q) has to be added to the boiler 16 and the more efficient the overall system becomes.

The heat exchanger arrangement 20 has a heat-absorbing exchange section 22 that absorbs heat energy from the residual steam 14. The heat exchanger arrangement 20 also contains a heat-releasing exchange section 24 that is located in a water preheater 18. The heat-absorbing exchange section 22 and the heat-releasing exchange section 24 are interconnected in a closed loop system 26. Within the closed loop system 26 is an interconnecting gas flow path 28 that is filled with a gas medium 30. The gas medium 30 is caused to flow throughout the gas flow path 28 by a pump 32.

The gas medium 30, within the closed loop system 26, has a heat capacity significantly greater than that of the residual steam 14 from which the heat energy is being absorbed. To absorb heat energy into the intermediate gas stream the temperature of the particular element of the gas stream is less than the steam element in adjacent steam stream. The intermediate gas stream flow rate is set to maintain a delta temperature difference that is less than the temperature of the steam stream at all points along the heat exchanger. The heat capacity of the dynamic gas is defined as Heat Capacity=Specific Heat 'c' of Gas×Mass of Gas    Equation (1)

wherein the heat capacity is defined as the amount of heat energy ($\Delta Q$) required to raise its temperature ($\Delta T$). Specifically, heat capacity is the amount of heat energy ($\Delta Q$) supplied to gas divided by the corresponding rise in temperature ($\Delta T$). This is represented by Equation (2) below;

$$\text{Heat Capacity} = \frac{\Delta Q}{\Delta T} \qquad \text{Equation (2)}$$

Substituting Equation 1 into Equation 2 it will be understood that:

$$m = \frac{\Delta Q}{C \times \Delta T} \qquad \text{Equation (3)}$$

Since the gas medium 30 is non-condensing and flows through the gas flow path 28 of the heat exchange arrangement 20, the gas medium 30 is cooled at the heat-releasing exchange section 24 and heated in the heat-absorbing exchange section 22. The gas medium 30 selected must remain in gaseous form through this temperature range. Furthermore, it is desired that the gas medium 30 selected has good thermal conductivity and a specific heat that is greater than that of the steam. In this manner, using Equation 3, it can be seen that if a gas medium has a low heat capacity and good thermal conductivity then a maximum temperature of the transfer gas is reached. Since the temperature gradient determines the direction of heat flow this makes the easiest means of efficiently transferring the energy from the exhaust stream back to the water in pre-heat.

Hydrogen gas is an optimal gas medium. Hydrogen gas has a specific heat nearly ten times that of steam. Helium too has a large specific heat. However, since the gas medium 30 is flowing through a closed loop system 26, both hydrogen and helium tend to leak out of traditional conduits and, therefore, require periodic replenishment. If replenishment is an issue other gases can be used.

In the exemplary embodiment of FIG. 1, the mass of the residual steam 14 produced by the steam engine 10 is the same as the mass of the water 12 used to produce the steam, minus negligible system losses. Knowing the mass of the water 12, the heat energy ($\Delta Q$) needed to convert the water to steam is readily calculated. Enough heat energy has to be added to the water 12 not only to raise the temperature to its boiling point, but to provide the extra heat energy needed to change the phase of the water and vaporize the water into steam.

Figure 2:
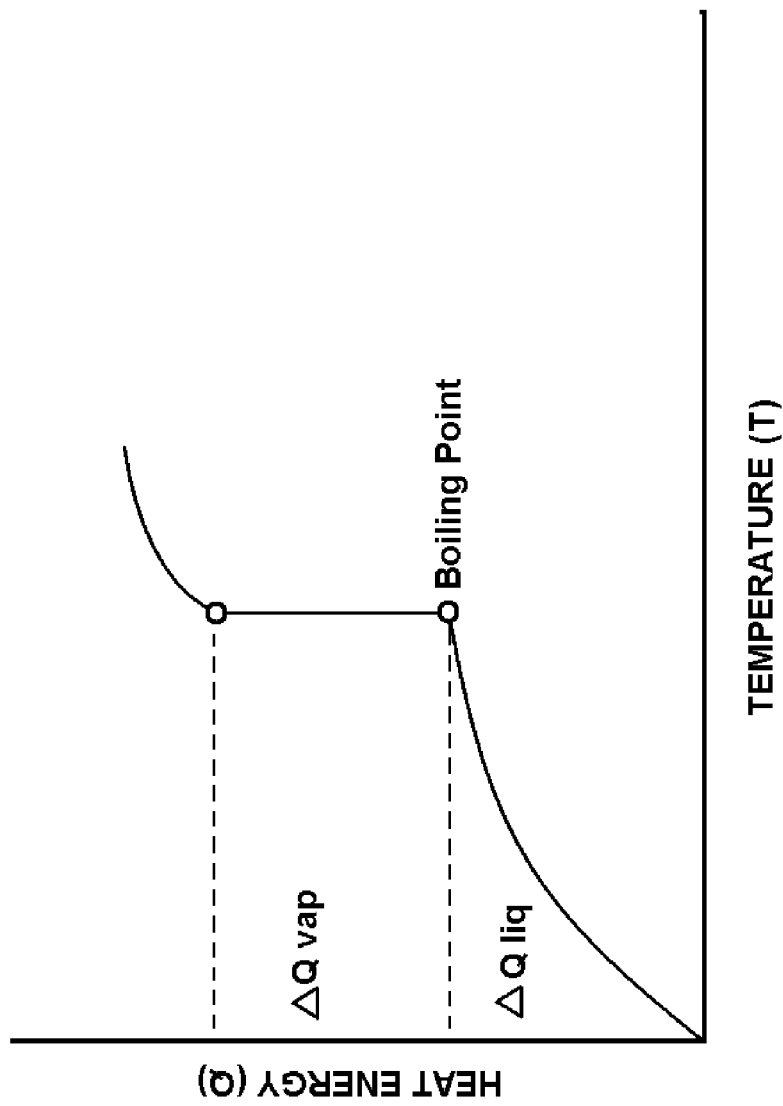
FIG. 2 is a graph that plots heat energy verses temperature and illustrated the gas phase change of water.

Referring to FIG. 2 in conjunction with FIG. 1, it can be seen that the water 12 is initially at a first low temperature (T1). The boiler 16 adds enough heat energy to convert the water to steam. Accordingly, the boiler 16 adds enough heat energy ($\Delta Q_{liq}$) to raise the water to its boiling point. The boiler then adds the heat energy ($\Delta Q_{vap}$) needed for the phase transition of the water to steam. As the water is converted into steam, a significant amount of heat energy ($\Delta Q_{vap}$) is added to the water, the temperature of the water does not increase. Rather, the heat energy ($\Delta Q_{vap}$) is utilized in the phase transition.

Using residual steam 14 to raise the temperature of water 12 toward its boiling point can be accomplished with many different prior art heat exchangers. Heating cold water with hot steam is straightforward because a clear temperature differential exists between the steam and the water. However, as the water reaches its boiling point, the temperature differential between the water and the steam decreases and eventually disappears. With no temperature differential, prior art heat exchangers reach equilibrium and stop transferring heat. It will therefore be understood that although the residual steam 14 contains more heat energy than water 12 at the same temperature, this extra heat energy cannot be efficiently transferred to the water.

In the present invention heat exchanger arrangement 20, the gas medium 30 is pumped through the closed loop system 26 at a mass flow rate sufficient to ensure that the specific heat of the gas medium 30 surpasses that of the residual steam 14. From Equation 3 previously presented, it will therefore be understood that the gas medium 30 has the ability to absorb more heat energy from the residual steam 14 than is available in the residual steam 14.

The gas medium 30, therefore, not only absorbs the heat energy from the high temperature of the residual steam 14, the gas medium 30 has the ability to absorb some of the latent heat of vaporization that is embodied by the residual steam 14.

The heat energy taken from the residual steam 14 is contained within the flowing gas medium 30 and is retained until the gas medium 30 flows through the heat-releasing exchange section 24. In the heat-releasing exchange section 24, the heat contained in the gas medium 30 is transferred to the incoming water 12. Since the heat energy available contains not only the heat energy from the temperature differential but also some of the latent heat of vaporization, a large amount of heat energy is transferred to the incoming water 12. More heat energy can therefore be added to the water 12 than is needed to bring the water 12 to its boiling temperature. Some of the latent heat of vaporization is therefore transferred to the preheated water, thereby increasing the overall efficiency of the entire system.

The present invention heat exchanger arrangement 20 can be used in systems far more complicated than steam boilers. As will be explained, the heat exchanger arrangement 20 is particularly well suited for use in making hydrogen gas supply systems more efficient.

Figure 3:
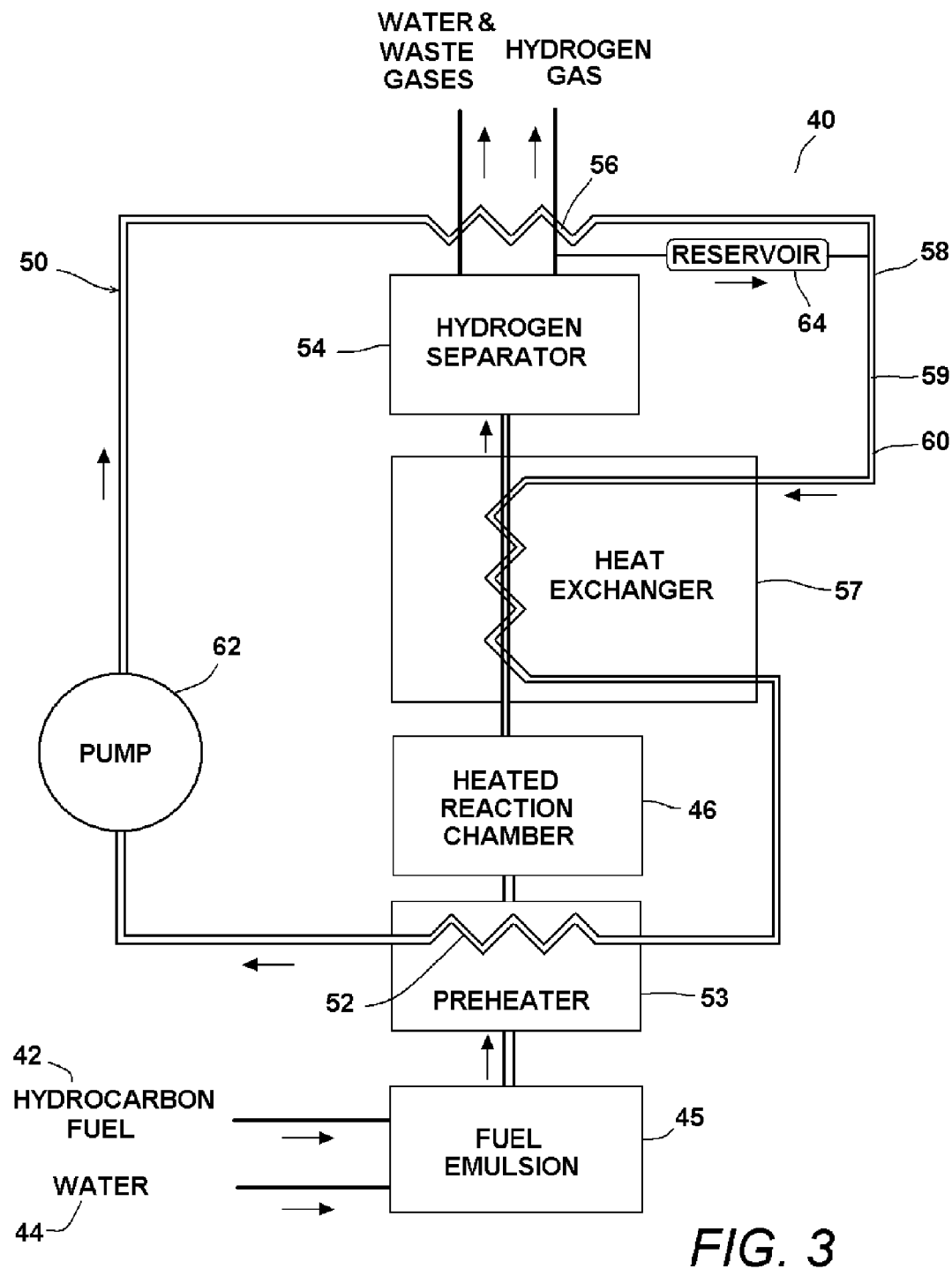
FIG. 3 is a block diagram schematic of the present invention heat exchanger arrangement shown using hydrogen gas as the transfer medium between exhaust gases/liquids and the income liquid supply.

Referring to FIG. 3, a schematic of the exemplary hydrogen supply system 40 is shown containing the present invention heat exchanger arrangement 50. The exemplary hydrogen supply system 40 creates hydrogen gas by reacting a hydrocarbon fuel 42 and water 44 and then separating hydrogen from the resultant gases.

As is indicated in FIG. 3, the hydrocarbon fuel 42 and the water 44 are both initially liquids. The two liquids must be vaporized prior to entering a heated reaction chamber 46. The heated reaction chamber 46 is maintained at an operational temperature that optimizes reactions between the hydrocarbon fuel vapors and water vapor. To vaporize the hydrocarbon fuel 42 and the water 44, the hydrocarbon fuel 42 and water 44 are mixed in precalculated ratios to create a fuel emulsion 45. The fuel emulsion 45 is preheated into vapor prior to entering the heated reaction chamber 46. To heat the fuel emulsion 45 into vapor, the fuel emulsion 45 flows past a heat-releasing exchange section 52 in a preheater 53. The heat-releasing exchange section 52 adds enough heat to the fuel emulsion 45 to cause the fuel emulsion 45 to vaporize.

The hydrocarbon fuel 42 and water 44 are initially mixed at a first low temperature to create a liquid fuel emulsion 45. The hydrogen supply system 40 reacts vapors of the fuel emulsion 45 in the heated reaction chamber 46 at an operational temperature. The efficiency of the overall system can be dramatically increased by preheating the fuel emulsion 45 through a full phase transition using the heat exchanger arrangement 50. The closer to the operational temperature that the fuel emulsion 45 can be preheated, the more efficient the overall system becomes.

In the hydrogen supply system 40, both the hydrocarbon fuel 42 and the water 44 pass through flow controls (not shown) that selectively vary and measure the flow of these liquids. The ratio of hydrocarbon fuel 42 to water 44 in the fuel emulsion 45 can therefore be precisely controlled. Additionally, the overall mass flow of the fuel emulsion 45 is also precisely controlled.

The fuel emulsion 45 has a predetermined heat capacity that depends largely upon its root ingredients. The fuel emulsion 45 is vaporized by the heat-releasing exchange section 52 within the preheater 53. The vaporized fuel emulsion enters the heated reaction chamber 46. The heated reaction chamber 46 reacts the hydrocarbon fuel and water to create, among other things, hydrogen gas. The hydrogen gas is mixed with waste gases, such as steam. The hydrogen gases and waste gases are at the operating temperature of the heated reaction chamber 46, which is typically between 500° C. to 900° C.

To separate the hydrogen gas from the other waste gases, all gases are passed through a hydrogen separator 54. The hydrogen separator 54 contains a hydrogen permeable membrane that filters the hydrogen from the remnant waste gases. The separated hydrogen can then be collected and/or utilized as fuel by a fuel cell. An example of a heated reaction chamber and hydrogen separator is disclosed in co-pending patent application Ser. No. 11/097,535 to Bossard et al., entitled System And Method For Efficiently Separating Hydrogen Gas From A Mixed Gas Source, filed Mar. 31, 2005, the disclosure of which is incorporated into this specification by reference.

Both the hydrogen gas and the waste gases exiting the hydrogen separator are hot (over 500° C.). Much of the heat energy in these gases can be recycled using the present invention heat exchanger arrangement 50. The heat exchanger arrangement 50 includes at least one heat-absorbing exchange section 56. The heat-absorbing exchange section 56 is exposed to the waste gases, water vapor and hydrogen gas that are exiting the hydrogen separator 54. The second heat-absorbing exchange section 57 is exposed to the hydrogen gas. It will be understood that the use of one heat-absorbing exchange sections 56 is optional. Different exchange sections can be used for the waste gases and the hydrogen gas. Furthermore, a heat exchanger may absorb heat from only the waste gases or the hydrogen gas if the heat contained within either stream is sufficient for system needs.

If the heat being absorbed from the waste gases and the hydrogen gas is insufficient for systems needs, a secondary heat exchanger 57 can be provided. The secondary heat exchanger can enable recycle heat from the heated reaction chamber 46 to help heat the gas medium flowing through the heat exchanger arrangement 50.

The heat-releasing exchange section 52, and the heat-absorbing exchange section 56 are interconnected in a closed loop system 58. If a secondary heat exchanger 57 is used, it too is interconnected in a closed loop system. Within the closed loop system 58 is an interconnecting gas flow path 59 that is filled with a gas medium 60. The gas medium 60 is caused to flow throughout the gas flow path 59 by a pump 62. The flow rate of the gas medium 60 within the closed loop system 58 depends upon the gas selected as the gas medium as well as the characteristics of the hydrocarbon fuel 42 and water 44 being heated by the heat-releasing exchange section 52.

Since the hydrogen supply system 40 generates pure hydrogen, hydrogen gas is a preferred gas medium 60. A small reservoir 64 of hydrogen gas can be maintained. If hydrogen gas leaks, the reservoir 64 can be used to periodically replenish the supply.

The specific heat of the waste gases and the hydrogen gas is quantifiable. The flow of the gas medium 60 through the closed loop system 58 is calculated so that the gas medium 60 is capable of absorbing more heat energy than is represented by just the temperature of the waste gases and the hydrogen gas. This enables some of the latent heat of vaporization to be absorbed by the gas medium 60. The gas medium 60 flows through the closed loop system 58 to the heat-releasing exchange section 52. The heat is transferred to the fuel emulsion 45 thereby providing more heat energy than is necessary to fully vaporize the fuel emulsion 45.

Figure 4:
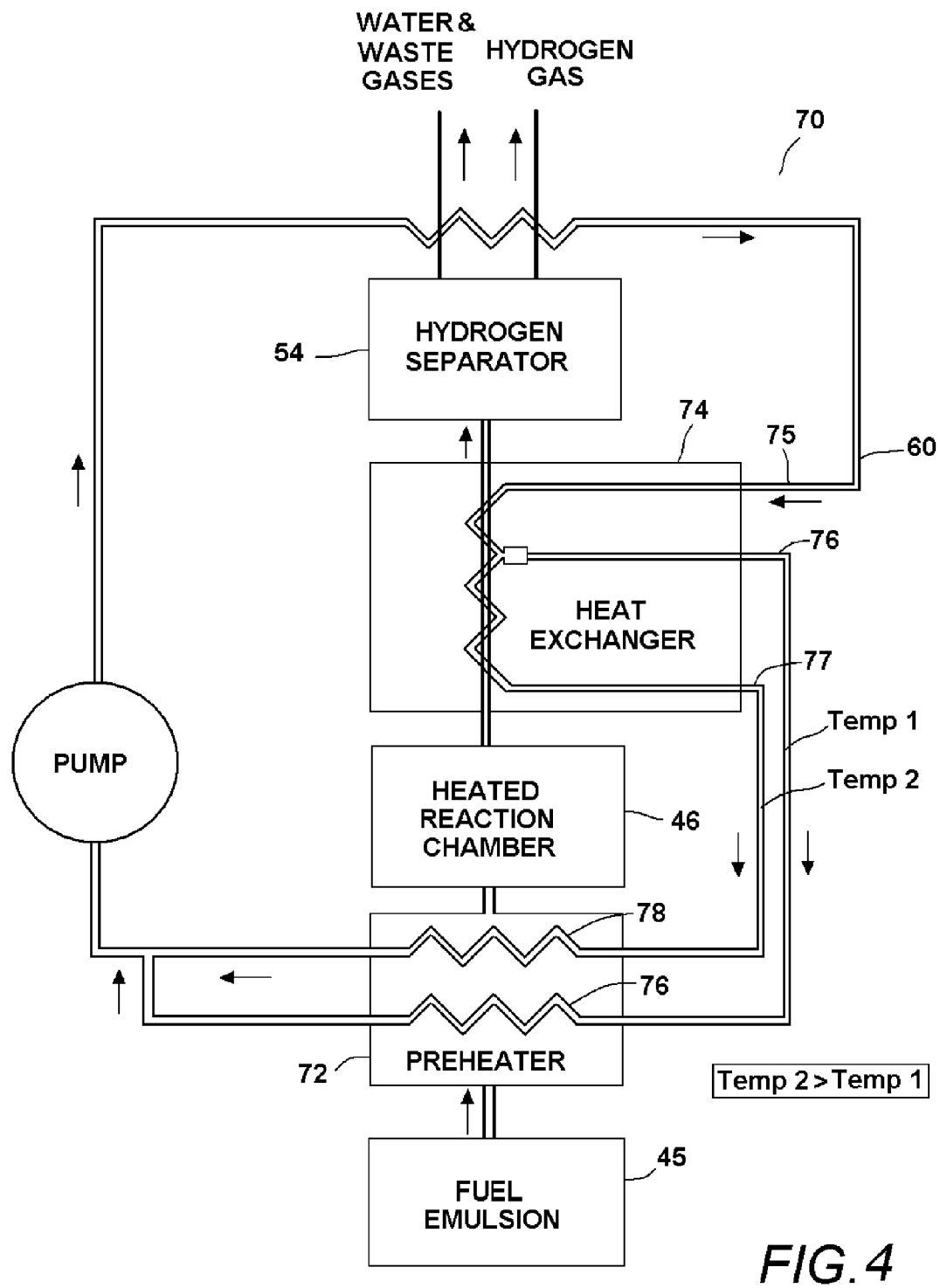
FIG. 4 is a block diagram schematic of an alternate embodiment of a heat exchanger arrangement having a two stage preheater.

Referring to FIG. 4, a variation of a hydrogen supply system 70 is shown. Since the variations contains many of the same components as that shown in FIG. 3, the same reference numbers will be used to identify the same components in order to prevent confusion.

In the hydrogen supply system 70 of FIG. 4, a two stage preheater 72 is used to heat the fuel emulsion 45. A secondary heat exchanger 74 is placed between the heated reaction chamber 46 and the hydrogen separator 54. The secondary heat exchanger 74 absorbs heat from the output of the heated reaction chamber 46 and utilizes that heat to heat the gas medium 60 flowing into the secondary heat exchanger 74. The secondary heat exchanger 74 has one input 75 and two outputs 76, 77. The first output 76, having absorbed a limited amount heat from the secondary heat exchanger 74, supplies a gas medium flow having a first temperature (Temp 1). The second output 78, having absorbed more heat from the secondary heat exchanger 74, supplies a gas medium flow having a second temperature (Temp 2) that is greater than that of the first temperature (Temp 1).

Within the preheater 72, the low temperature gas medium flow passes through a preliminary exchange element 76. The heat provided by the preliminary exchange element 76 is preferably sufficient to heat the fuel emulsion 45 to its boiling point. The high temperature gas medium flow passes through a supplemental exchange element 76. The heat provided by the supplemental exchange element 76 is preferably sufficient to provide the heat of vaporization required to convert the fuel emulsion 45 from a liquid to a gas.

In the exemplary embodiments of the present invention heat exchange arrangement that are illustrated, the heat exchange arrangement enables a liquid to be fully vaporized by recycled heat energy without the heat exchange arrangement coming to an equilibrium. It will be understood that the exemplary embodiments illustrated and described are merely exemplary and that a person skilled in the art can make many changes to the shown embodiments. All such variations, modifications, and alternate embodiments are intended to be included within the scope of the present invention as defined by the claims.

What is claimed is:

1. A system for converting a mixture of hydrocarbon fuel and $H_2O$ into hydrogen gas, comprising:
   a heated reaction chamber that reacts said mixture to create hot reactant gases that include hydrogen gas and waste gases;
   a hydrogen separator that separates said hydrogen gas from said waste gases, creating a separate hydrogen stream and waste gas stream;
   a looped gas flow path having an exothermic exchange section thermally exposed to said mixture, and a first endothermic exchange section thermally exposed to said hydrogen stream;
   a volume of a gas medium; and
   a pump for pumping said gas medium through said gas flow path at a predetermined mass flow rate, wherein said gas medium absorbs heat energy in said first endothermic exchange section and releases heat energy in said exothermic heat section.

2. The system according to claim 1, wherein said gas medium includes hydrogen gas.

3. The system according to claim 2, further including a hydrogen gas reservoir coupled to said looped gas flow path for maintaining said gas medium above a predetermined pressure level.

4. The system according to claim 3, wherein said hydrogen gas reservoir is coupled to said hydrogen gas stream and is replenished by said hydrogen gas stream.

5. The system according to claim 1, further including a second endothermic exchange section thermally exposed to said hot reactant gases, wherein said gas medium absorbs heat energy in said second endothermic exchange section.

6. The system according to claim 1, wherein said first endothermic exchange section is thermally exposed to said waste gas stream.

7. The system according to claim 1, wherein said gas flow path is a closed loop and said pump continuously circulates said gas medium through said closed loop.

8. A system for converting a mixture of hydrocarbon fuel and $H_2O$ into hydrogen gas, comprising:

a heated reaction chamber for converting said fuel mixture into reactant gases that include hydrogen gas and waste gases;

a hydrogen separator for separating said hydrogen gas from said waste gases, therein creating a hydrogen gas stream and a waste gas stream that are separate; and a heat exchanger that absorbs heat energy from both said waste gas stream and said hydrogen gas stream to preheat said mixture utilizing said heat energy, said heat exchanger having at least one endothermic exchange section that absorbs heat from said hydrogen gas stream, and at least one exothermic exchange section is in thermal contact with said mixture, wherein said at least one endothermic exchange section and said at least one exothermic exchange section are disposed along a continuous gas flow path through which a gas medium flows.

9. The system according to claim 8, wherein said at least one endothermic exchange section absorbs heat from said reactant gases.

10. The system according to claim 8, wherein said at least one endothermic exchange section absorbs heat from said waste gas stream.

11. The system according to claim 8, wherein said gas medium includes hydrogen gas.

12. The system according to claim 8, further including a pump for pumping said gas medium through said gas flow path.

13. The system according to claim 8, wherein said gas medium is replenished by said hydrogen from said hydrogen gas stream.

* * * * *